US010231227B2

(12) United States Patent
Lee et al.

(10) Patent No.: US 10,231,227 B2
(45) Date of Patent: Mar. 12, 2019

(54) MULTI-POINT CONTENT TRANSMISSION METHOD AND APPARATUS

(71) Applicant: Samsung Electronics Co., Ltd., Gyeonggi-do (KR)

(72) Inventors: Min-Gyu Lee, Gyeonggi-do (KR); Byung-Moo Lee, Seoul (KR); Hae-Young Jun, Gyeonggi-do (KR); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 62 days.

(21) Appl. No.: 15/614,101

(22) Filed: Jun. 5, 2017

(65) Prior Publication Data

US 2017/0353948 A1 Dec. 7, 2017

Related U.S. Application Data

(60) Provisional application No. 62/345,097, filed on Jun. 3, 2016.

(30) Foreign Application Priority Data

Apr. 25, 2017 (KR) ........................ 10-2017-0053132

(51) Int. Cl.

*H04W 72/04* (2009.01)
*H04W 4/06* (2009.01)
*H04N 21/236* (2011.01)
*H04L 29/08* (2006.01)
*H04L 29/06* (2006.01)
(Continued)

(52) U.S. Cl.

CPC ....... *H04W 72/042* (2013.01); *H04L 43/0894* (2013.01); *H04L 43/16* (2013.01);
(Continued)

(58) Field of Classification Search

CPC .... H04W 72/042; H04W 4/06; H04N 21/236; H04H 20/06; H04H 20/103; H04L 12/189
See application file for complete search history.

(56) References Cited

U.S. PATENT DOCUMENTS 7,664,875 B1 2/2010 Clay et al.
2011/0182275 A1 7/2011 Mizusawa et al.
(Continued)

FOREIGN PATENT DOCUMENTS

JP 2011-193428 9/2011
KR 101640452 7/2016

OTHER PUBLICATIONS

International Search Report dated Aug. 30, 2017 issued in counterpart application No. PCT/KR2017/005814, 7 pages.
(Continued)

*Primary Examiner* — Habte Mered
*Assistant Examiner* — Brian P Cox
(74) *Attorney, Agent, or Firm* — The Farrell Law Firm, P.C.

(57) ABSTRACT

A method for transmitting a content by a terminal is provided. The method includes sending a request for multi-point transmission for the content to a display device, receiving information about a first transmission rate between the display device and an access point (AP) from the display device, determining a first content distribution ratio for the display device and a second content distribution ratio for the terminal based on a demanded transmission rate for transmission of the content and the first transmission rate, sending information about at least one of the first content distribution ratio and the second content distribution ratio to the display device, receiving a second content portion corresponding to the second content distribution ratio of the content from a content server, and sending the second content portion to the display device.

18 Claims, 15 Drawing Sheets

(51) Int. Cl.

| | |
|---|---|
| ***H04N 21/2665*** | (2011.01) |
| ***H04N 21/442*** | (2011.01) |
| ***H04L 12/26*** | (2006.01) |
| *H04H 20/06* | (2008.01) |
| *H04H 20/10* | (2008.01) |
| *H04L 12/18* | (2006.01) |
| *H04W 88/02* | (2009.01) |

(52) U.S. Cl.

CPC .......... *H04L 65/4084* (2013.01); *H04L 65/80* (2013.01); *H04L 67/06* (2013.01); *H04L 67/2814* (2013.01); *H04N 21/236* (2013.01); *H04N 21/2665* (2013.01); *H04N 21/44209* (2013.01); *H04W 4/06* (2013.01); *H04H 20/06* (2013.01); *H04H 20/103* (2013.01); *H04L 12/189* (2013.01); *H04W 88/02* (2013.01)

(56) References Cited

U.S. PATENT DOCUMENTS

2011/0252118 A1* 10/2011 Pantos .............. G06F 17/30053 709/219
2014/0040364 A1* 2/2014 Baldwin ............... H04L 65/605 709/204
2014/0173056 A1 6/2014 Lear et al.
2014/0281006 A1* 9/2014 Major ..................... H04L 65/60 709/231
2014/0328251 A1 11/2014 Hassan et al.
2014/0334504 A1 11/2014 Yie et al.
2014/0359672 A1 12/2014 Lin et al.
2015/0256563 A1 9/2015 Le Guen et al.
2015/0271096 A1* 9/2015 Das ....................... H04L 47/783 709/213
2015/0358820 A1 12/2015 Li et al.
2016/0127996 A1 5/2016 Patil et al.
2018/0116005 A1* 4/2018 Ravuvari ............ H04W 36/385

OTHER PUBLICATIONS

Guillaume Bichot et al., Robust “File Casting” for Mobile TV, International Broadcasting Conference, XP030081589, Sep. 6, 2007, 7 pages.

European Search Report dated Dec. 7, 2018 issued in counterpart application No. 17807066.0-1218, 8 pages.

* cited by examiner

| Message ID | Req/Res (Direction) | RTSP message |
|---|---|---|
| M3 | REQUEST (SOURCE DEVICE → SINK DEVICE | GET_PARAMETER rtsp://localhost/wfd1.0 RTSP/15.0<br>CSeq: i+1<br>Content-Type: text/parameters<br>Content-Length: wfd-redirection-capability,<br>wfd-buffer-length, wfd-multipoint-capability; ~1360 |
| | RESPONSE (SINK DEVICE → SOURCE DEVICE | RTSP/15.0 200 OK CSeq: i+1<br>Content-Type: text/parameters<br>Content-Length:<br>wfd-redirection-capability:<br>browser-support =supported;<br>service-name-list =com.youtube com.netflix;<br>vendor-param=<br>"Multipoint:ok, AP-TV rate: 100Mbps,<br>Phone-TV rate: 200Mbps, Buffer: 2Gbytes" ~1370 |
| M4 | REQUEST (SOURCE DEVICE → SINK DEVICE | SET_PARAMETER rtsp://localhost/wfd1.0 RTSP/15.0<br>CSeq: i+2<br>Content-Type: text/parameters<br>Content-Length:<br>wfd-redirection-config:<br>service-name=com.youtube;<br>content-id=3rrrKEYY6Kg; playback-time=00:10:00;<br>credentials ="aGVsbG8gd29ybGQ=" ;<br>vendor-param =<br>"Multipoint: ok, Range1: 0~n, Range2: n+1~m" ~1380 |
| | RESPONSE (SINK DEVICE → SOURCE DEVICE | RTSP/15.0 200 OK<br>CSeq: i+2 |

FIG.13B

MULTI-POINT CONTENT TRANSMISSION METHOD AND APPARATUS

PRIORITY

This application claims priority under 35 U.S.C. § 119(e) to a U.S. Provisional Patent Application filed on Jun. 3, 2016 in the United States Patent and Trademark Office and assigned Ser. No. 62/345,097, and under 35 U.S.C. § 119(a) to a Korean Patent Application filed on Apr. 25, 2017 in the Korean Intellectual Property Office and assigned Serial No. 10-2017-0053132, the entire content of each of which is incorporated herein by reference.

BACKGROUND

1. Field of the Disclosure

The present disclosure relates generally to a method and an apparatus for transmitting content through multiple points, and more particularly, to a method and an apparatus for supporting a provision of content in a multi-point manner when performing a content redirection operation.

2. Description of the Related Art

The introduction of wireless fidelity (Wi-Fi) communication-enabled displays and streaming apparatuses, e.g., smart TVs, led to an expansion of the market for terminal-centered TV control solutions supporting a content redirection operation and terminals supportive of TV control solutions. A content redirection operation may be an operation that enables a TV to request content through communication with a content server through the control of a terminal, receive content corresponding to the request, and play the received content. A content redirection operation may be performed based on a single point connection between an access point (AP) and a TV. Thus, the quality of content playing on a TV relies on a transmission rate between an AP and a TV. However, an insufficient transmission rate between an AP and a TV may cause a service failure or a prolonged wait time. Accordingly, a need exists for securing an increased transmission rate when a TV receives content based on a content redirection operation.

SUMMARY

An aspect of the present disclosure provides a method and an apparatus for supporting a provision of content in a multi-point manner when performing a content redirection operation.

Another aspect of the present disclosure provides a method and an apparatus for preventing a delay of content transmission or a wait time in content transmission.

Another aspect of the present disclosure provides a method and an apparatus for transmitting content to a TV by a terminal, as well as by an AP.

Another aspect of the present disclosure provides a method and an apparatus for determining one of combinations of various paths to support multipoint-based content transmission.

In accordance with an aspect of the present disclosure, a method for transmitting a content by a terminal is provided. The method includes sending a request for multi-point transmission for the content to a display device, receiving information about a first transmission rate between the display device and an AP from the display device, determining a first content distribution ratio for the display device and a second content distribution ratio for the terminal based on a demanded transmission rate for transmission of the content and the first transmission rate, sending information about at least one of the first content distribution ratio and the second content distribution ratio to the display device, receiving a second content portion corresponding to the second content distribution ratio of the content from a content server, and sending the second content portion to the display device.

In accordance with another aspect of the present disclosure, a method for receiving a content by a display device is provided. The method includes receiving a request for multi-point transmission for the content from a terminal, sending information about a first transmission rate between the display device and an AP to the terminal, receiving information about at least one of a first content distribution ratio for the display device and a second content distribution ratio for the terminal from the terminal, receiving a first content portion corresponding to the first content distribution ratio of the content from a content server, receiving a second content portion from the terminal, and combining and playing the first content portion and the second content portion.

In accordance with another aspect of the present disclosure, a terminal transmitting a content is provided. The terminal includes a transceiver configured to send a request for multi-point transmission for the content to a display device and receive information about a first transmission rate between the display device and an AP from the display device, and a controller configured to determine a first content distribution ratio for the display device and a second content distribution ratio for the terminal based on a demanded transmission rate for transmission of the content and the first transmission rate, wherein the transceiver is further configured to send information about at least one of the first content distribution ratio and the second content distribution ratio to the display device, receive a second content portion corresponding to the second content distribution ratio of the content from a content server, and send the second content portion to the display device.

In accordance with another aspect of the present disclosure, a display device receiving a content is provided. The display device includes a transceiver configured to receive a request for multi-point transmission for the content from a terminal, send information about a first transmission rate between the display device and an AP to the terminal, receive information about at least one of a first content distribution ratio for the display device and a second content distribution ratio for the terminal from the terminal, receive a first content portion corresponding to the first content distribution ratio of the content from a content server, and receive a second content portion corresponding to the second content distribution ratio from the terminal, and a controller configured to combine the first content portion and the second content portion based on the first content distribution ratio and the second content distribution ratio and play the first content portion and the second content portion combination through a display unit.

BRIEF DESCRIPTION OF THE DRAWINGS

The foregoing and other aspects, features, and advantages of the present disclosure will be more apparent from the following detailed description, taken in conjunction with the accompanying drawings, wherein:

FIG. 13B is a table of formats of miracast R2 standard messages that add parameters necessary for multi-point transmission according to an embodiment of the present disclosure;

DETAILED DESCRIPTION OF EMBODIMENTS OF THE PRESENT DISCLOSURE

Figure 1:
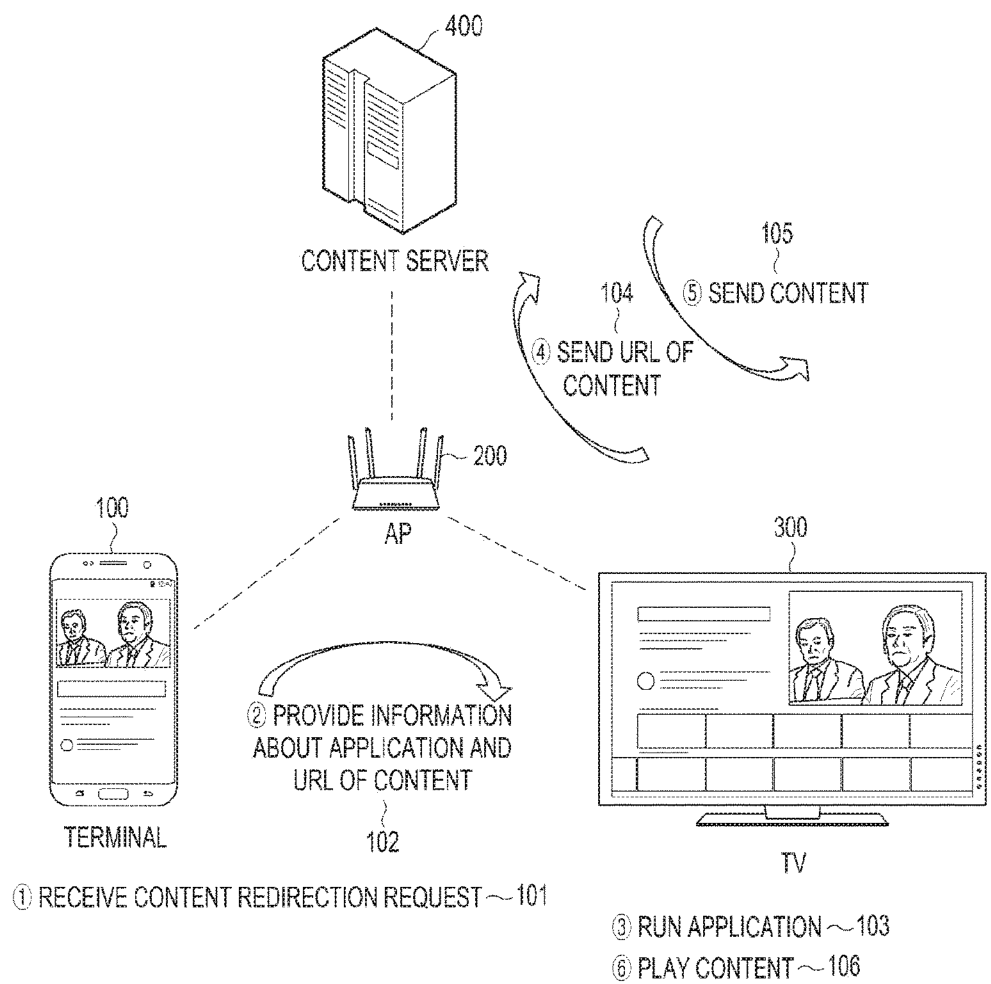
FIG. 1 is an illustration of a content redirection operation scheme.

Hereinafter, embodiments of the present disclosure are described in detail with reference to the accompanying drawings.

In describing the embodiments of the present disclosure, descriptions of technologies that are known in the art and are not directly related to the present disclosure are omitted. This is for clarifying the present disclosure without obfuscating the present disclosure.

For the same reasons, some elements may be exaggerated or schematically shown. The size of each element does not necessarily reflect the actual size of each element. The same reference numeral is used to refer to the same element throughout the accompanying drawings.

Advantages and features of the present disclosure, and methods for achieving the same may be understood through the embodiments of the present disclosure described below and taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims and their equivalents.

It should be appreciated that the blocks in each flowchart and combinations of the flowcharts may be performed by computer program instructions. Since computer program instructions may be loaded in a processor of a general-use computer, a special-use computer or other programmable data processing devices, the instructions executed by a processor of a computer or other programmable data processing devices generate means for performing the functions described in connection with a block(s) of each flowchart. Since computer program instructions may be stored in a non-transitory computer-available or computer-readable memory that may be oriented to a computer or other programmable data processing devices to implement a function in a specified manner, the instructions stored in the non-transitory computer-available or computer-readable memory may produce a product including an instruction means for performing the functions described in connection with a block(s) in each flowchart. Since computer program instructions may be loaded in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, a segment, or a part of a code including one or more executable instructions for executing a specified logical function(s). Further, it should also be noted that in some replacement execution examples, functions mentioned in the blocks may occur in different orders. For example, two blocks that are consecutively shown may be performed substantially simultaneously or in a reverse order depending on the corresponding functions.

As used herein, the term “unit” indicates a software element or a hardware element such as a field-programmable gate array (FPGA) or an application specific integrated circuit (ASIC). A unit plays a certain role. However, the term “unit” is not limited to indicating a software or a hardware element. A unit may be configured in a storage medium that may be addressed or may be configured to reproduce one or more processors. Accordingly, for example, a unit includes elements, such as software elements, object-oriented software elements, class elements, task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more central processing units (CPUs) in a device or a security multimedia card.

Although the description of embodiments herein focuses primarily on examples of orthogonal frequency division multiplexing (OFDM)-based wireless communication systems, the subject matter of the present disclosure may also be applicable to other communication systems or services having similar technical backgrounds without departing from the scope and spirit of the present disclosure, and this may be understood by one of ordinary skill in the art.

FIG. 1 is an illustration of a content redirection operation scheme.

Referring to FIG. 1, a content redirection operation is performed through a terminal 100, an AP 200, a content server 400, and a display device having a communication function, e.g., a television (TV) 300. To perform the content redirection operation, the terminal 100 receives a content redirection request through an application that provides a content service from a user in step 101. The terminal 100 may send, through the AP 200 to the TV 300, the address, e.g., a uniform resource locator (URL), of content and application information for using the content service in step 102. The content indicates multimedia data that the user desires to view through the TV 300. The content may be a multimedia file or a media package that may be accessed through the URL.

The TV 300 runs an application based on the received application information in step 103 and sends a request for content transmission through the AP 200 to the server 400. In addition, the TV 300 sends the URL of the content through the AP 200 to the content server 400 in step 104. The content server 400 sends content corresponding to the received URL of content through the AP 200 to the TV 300 in step 105. The TV 300 plays the content received through the AP 200 in step 106.

Although described and illustrated are operations when the terminal 100 and the TV 300 are connected via the same AP 200 according to the present disclosure, it should be noted that a similar description may also apply where the terminal 100 and the TV 300 are connected to different APs.

Figure 2:
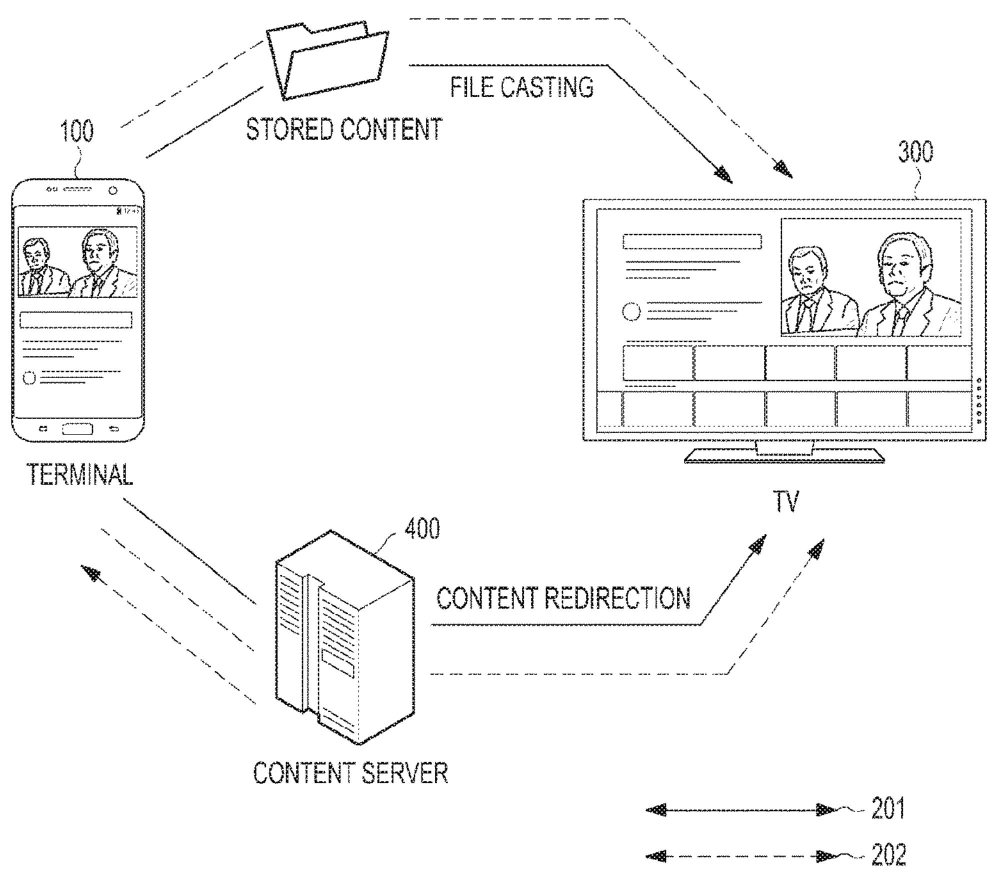
FIG. 2 is an illustration of a multi-point transmission procedure as per a miracast R2 standard.

FIG. 2 is an illustration of a multi-point transmission procedure as per a miracast R2 standard.

Referring to FIG. 2, a TV 300 may play content through one of a context redirection scheme in which a terminal 100 requests a content server 400 to send content to the TV 300, and the content server 400 sends content to the TV 300, and a file casting scheme in which content received from the content server 400 and stored in the terminal 100 is sent to the TV 300. The miracast R2 standard supports a method for a switch between the content redirection scheme and the file casting scheme (201). Accordingly, content transmission methods supported by the miracast R2 standard are required to be optimized depending on the type, specification, and network environment of the AP, the terminal 100, and the TV 300.

According to an embodiment of the present disclosure, a multipoint-based content transmission method and apparatus may simultaneously perform a content redirection scheme in which the terminal 100 requests the content server 400 to send content to the TV 300, and a file casting scheme in which content received from the content server 400 and stored in the terminal 100 is sent to the TV 300 for the optimization depending on the type, specification, and network environment of the AP, the terminal 100, and the TV 300 (202). Accordingly, embodiments of the present disclosure may enhance the quality of content transmission to the TV 300.

Figure 3:
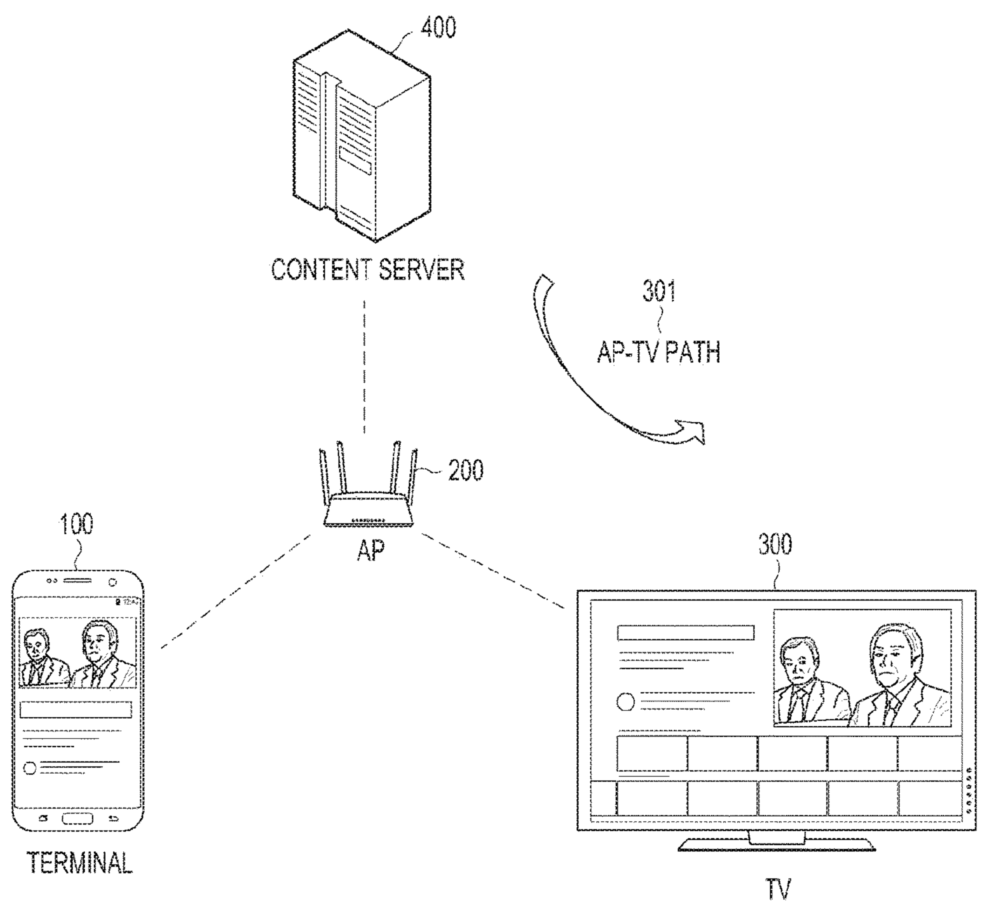
FIG. 3 is an illustration of a single point transmission method.

FIG. 3 is an illustration of a single point transmission method.

Referring to FIG. 3, a single point transmission method is a method by which content provided from a content server 400 is transmitted through an AP-TV path 301 between an AP 200 and a TV 300. Where content is transmitted through the AP-TV path 301, the AP-TV transmission rate between the AP 200 and the TV 300 may be lowered due to the physical distance between the AP 200 and the TV 300. Thus, it may be difficult to transmit content, particularly high-definition video content.

Figure 4:
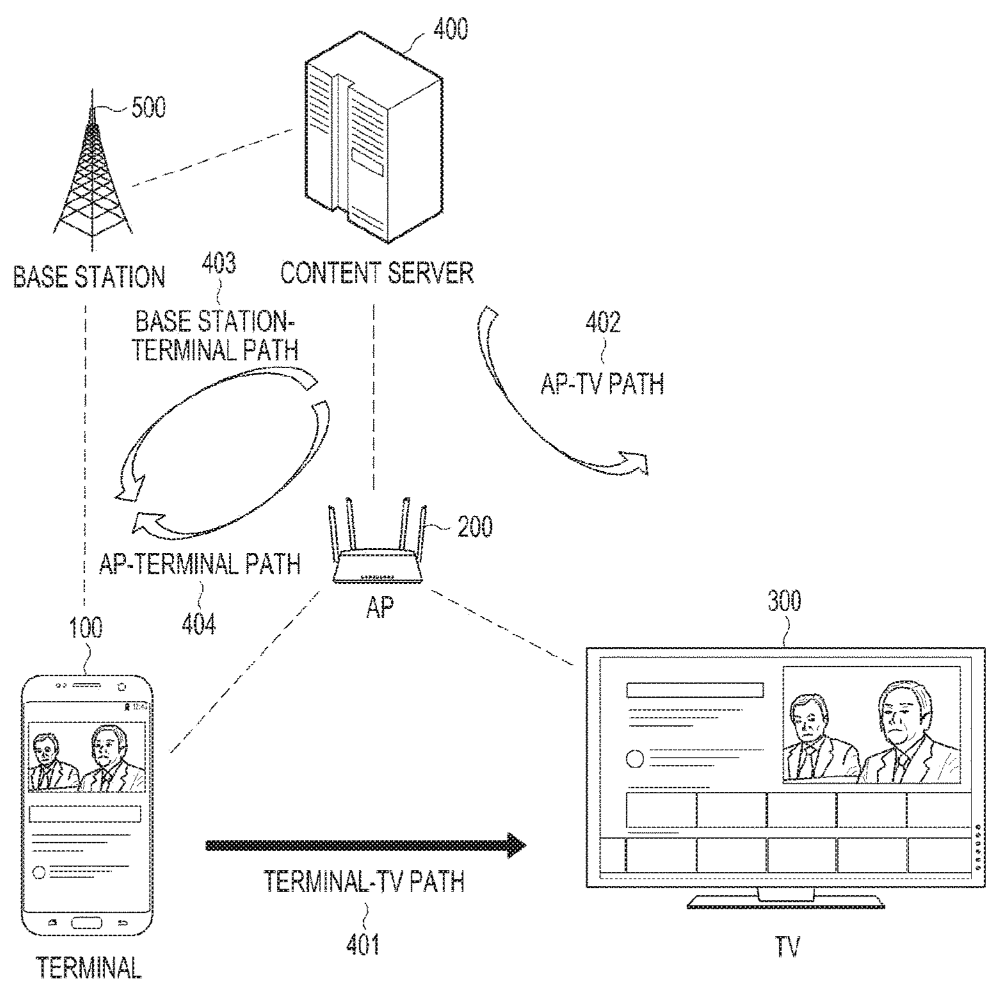
FIG. 4 is an illustration of a multi-point transmission method according to an embodiment of the present disclosure.

FIG. 4 is an illustration of a multi-point transmission method according to an embodiment of the present disclosure.

Referring to FIG. 4, content provided from a content server 400 is transmitted through a terminal-TV path 401 between a terminal 100 and a TV 300 and may be transmitted through an AP-TV path 402 between an AP 200 and the TV 300. In this case, the terminal 100 may receive content through a base station-terminal path 403 between a base station 500 and the terminal 100 and an AP-terminal path 404 between the AP 200 and the terminal 100. The content receiving path of the terminal 100 may include at least one of the base station-terminal path 403 and the AP-terminal path 404 depending on an AP-terminal-TV transmission rate which is a transmission rate among the AP, the terminal, and the TV.

According to an embodiment of the present disclosure, where the AP-terminal-TV transmission rate among the AP 200, the terminal 100, and the TV 300 is greater than a predetermined threshold, the terminal 100 may receive content only through the AP-terminal path 404. Unless the AP-terminal-TV transmission rate is greater than the predetermined threshold, the terminal 100 may receive content through the base station-terminal path 403 as well as the AP-terminal path 404. The terminal 100 sends the received content to the TV 300 using the terminal-TV path 401 through a point-to-point (P2P) connection with the TV 300. Accordingly, the TV 300 may, and simultaneously, receive the same content at a high transmission rate not only through the AP-TV path 402 but also through an additional path, i.e., the terminal-TV path 401.

Figure 5:
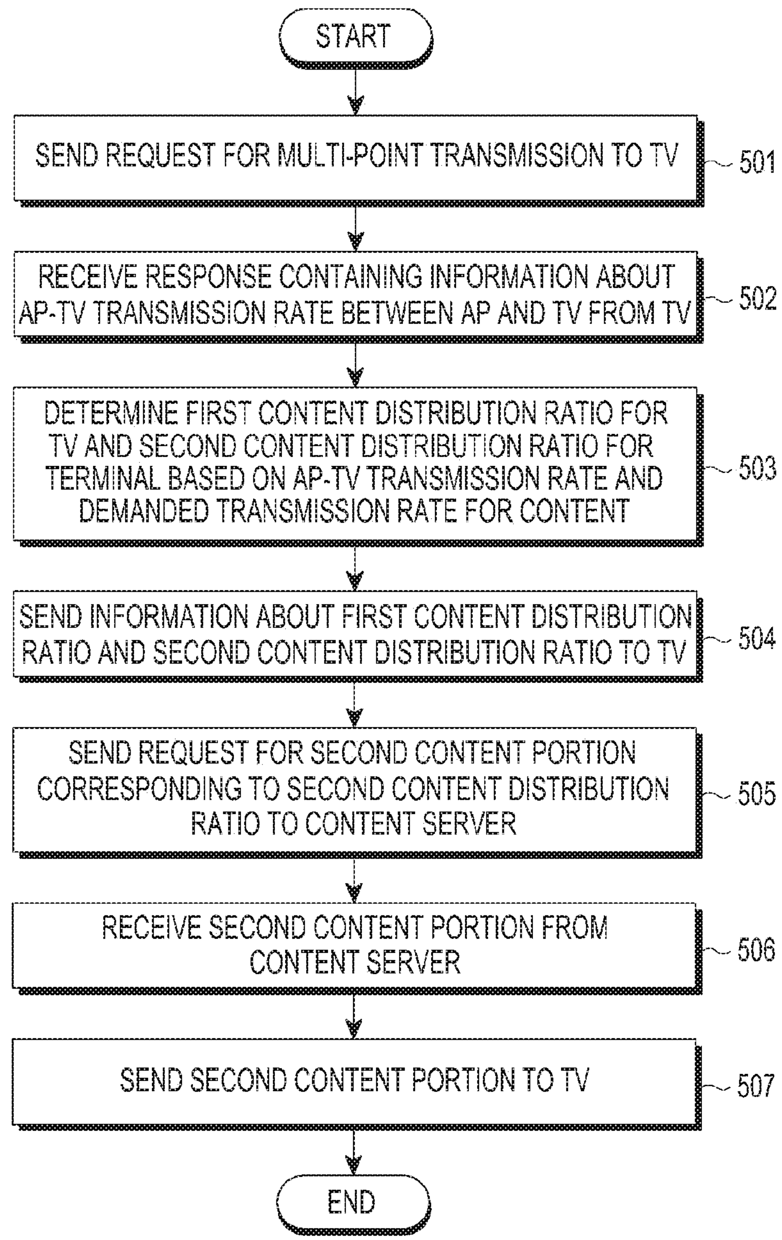
FIG. 5 is a flowchart of a multipoint-based content transmission method by a terminal according to an embodiment of the present disclosure.

FIG. 5 is a flowchart of a multipoint-based content transmission method by a terminal according to an embodiment of the present disclosure.

A terminal is in a state of being connected, e.g., P2P/tunneled direct link setup (TDLS), to a TV. The terminal receives a selection of content that a user is to view through the TV through an application from the user. The application may provide a service for playing content.

Referring to FIG. 5, the terminal sends a request for multi-point transmission to the TV in step 501. In this case, the request for multi-point transmission indicates a request for initiating multipoint-based content transmission. In other words, the request for multi-point transmission is a request to receive content that each of the AP and the terminal sends.

The terminal receives a response containing information about an AP-TV transmission rate which is a transmission rate between the AP and the TV from the TV in step 502.

Additionally, the response may further include at least one of a terminal-TV transmission rate which is a transmission rate between the terminal and the TV and capability information about the multi-point transmission. The capability information indicates whether multi-point transmission by both the AP and the terminal is accepted. The terminal may also determine an AP-terminal-TV transmission rate which is a transmission rate among the AP, terminal, and TV based on the number of antennas of the terminal, an AP-terminal transmission rate which is a transmission rate between the AP and the terminal, and the terminal-TV transmission rate.

The terminal determines a first content distribution ratio for the TV and a second content distribution ratio for the terminal based on a demanded transmission rate for the content and the AP-TV transmission rate in step 503. In this case, the demanded transmission rate is a total transmission rate that is required until content is sent from the content server to the TV and this may be determined by a quality of service (QoS) that is required for the content. According to an embodiment of the present disclosure, the demanded transmission rate may be obtained upon receiving a selection of content through an application. The first content distribution ratio is a ratio of a portion of the content which is to be sent from the AP to the TV—this portion is denoted a first content portion—to the whole content. The second content distribution ratio is a ratio of a portion of the content which is to be sent from the terminal to the TV—this portion is denoted a second content portion—to the whole content. The second content distribution ratio is a ratio of the other portion than the partial content (i.e., the first content portion) corresponding to the first content distribution ratio to the whole content. Accordingly, the content includes the first content portion and the second content portion.

According to an embodiment of the present disclosure, the terminal may receive content from the AP and use a single antenna to transmit the content to the TV. In this case, the terminal determines that a harmonized mean of the AP-terminal transmission rate and the terminal-TV transmission rate is the AP-terminal-TV transmission rate. Alternatively, the terminal may use a plurality of antennas to receive content from the AP while simultaneously transmitting the content to the TV. In this case, the terminal may determine that the lesser of the AP-terminal transmission rate and the terminal-TV transmission rate is the AP-terminal-TV transmission rate. The terminal may compare the determined AP-terminal-TV transmission rate with a predetermined threshold. In this case, the predetermined threshold is a reference for determining whether the AP-TV transmission rate is sufficient. Where the determined AP-terminal-TV transmission rate is greater than the threshold, the terminal determines to receive content only through the AP-terminal path. In contrast, unless the determined AP-terminal-TV transmission rate is greater than the threshold, the terminal may determine to receive the content through both the AP-terminal path and the base station-terminal path. Depending on the determination, the terminal may perform a procedure for connecting a data path for receiving the content with the AP or both the AP and the base station.

Where the AP-terminal-TV transmission rate is greater than a predetermined threshold, the terminal determines to receive the second content portion through the AP from the content server. Before receiving the second content portion through the AP from the content server, the terminal determines the first content distribution ratio and the second content distribution ratio. In the process of determining the first content distribution ratio and the second content distribution ratio, the terminal may determine the first content distribution ratio based on Equation (1) as follows:

$$\frac{AP\text{-}TV \text{ transmission rate}}{\text{demanded transmission rate}} = \text{first content distribution ratio} \tag{1}$$

The terminal may also determine the second content distribution ratio based on Equation (2) as follows:

$$\frac{\text{demanded transmission rate} - (AP\text{-}TV \text{ transmission rate})}{\text{demanded transmission rate}} = \text{second content distribution ratio} \tag{2}$$

In other words, the terminal may determine that a ratio of a remaining rate of the demanded transmission rate except for the AP-TV transmission rate to the demanded transmission rate is the second content distribution ratio.

Additionally, the terminal may determine a redistribution period for the first content distribution ratio and the second content distribution ratio. In this case, the redistribution period indicates a period for re-determining the first content distribution ratio and the second content distribution ratio while transmitting one content file to the TV. The reason for determining the content redistribution period is the likelihood that the AP-terminal transmission rate and the terminal-TV transmission rate may vary. For example, the AP-terminal transmission rate may be varied depending on the distance between the AP and the terminal. In other words, as the distance between the AP and the terminal decreases, the AP-terminal transmission rate increases, and as the distance between the AP and the terminal increases, the AP-terminal transmission rate decreases. Further, as the distance between the terminal and the TV decreases, the terminal-TV transmission rate increases, and as the distance between the terminal and the TV increases, the terminal-TV transmission rate decreases. For example, the AP-terminal transmission rate and the terminal-TV transmission rate may be varied depending on the configuration of obstacles and the circumstance of radio waves in the space where the terminal is located. Accordingly, the terminal may repeat the process of requesting to perform multi-point transmission to the TV according to the content redistribution period, thereby re-receiving the terminal-TV transmission rate from the TV and re-determining the first content distribution ratio and the second content distribution ratio according to the terminal-TV transmission rate and the AP-terminal transmission rate. In other words, the content may include a plurality of first content portions and a plurality of second content portions. The first content distribution ratio and the second content distribution ratio may be varied within the content redistribution period. The transmission rate of the TV receiving content may be enhanced by determining the content redistribution period.

The terminal sends information about the first content distribution ratio and the second content distribution ratio to the TV in step 504. Additionally, the terminal may further send, to the TV, at least one of the URL of the content that the user selects and information about an application that provides a content playing service. The terminal may also send information about the determined content redistribution period to the TV.

The terminal sends a request for the second content portion corresponding to the second content distribution ratio to the content server in step 505. Specifically, the terminal may send a request for the second content portion corresponding to the second content distribution ratio to the content server through the AP. Then, the terminal may send the URL of the content to the content server so that the content server may recognize the content for the second content portion.

The terminal receives the second content portion from the content server in step 506. Where the AP-terminal-TV transmission rate is greater than a predetermined threshold, the terminal receives the second content portion through the AP from the content server.

The terminal sends the second content portion to the TV in step 507.

Unless the AP-terminal-TV transmission rate is greater than the predetermined threshold, the terminal receives a portion of the second content portion through the base station from the content server, and the terminal may also receive another portion of the second content portion through the AP from the content server. In other words, the terminal may receive the second content portion through both the base station-terminal path and the AP-terminal path. Before receiving the content through the base station-terminal path and the AP-terminal path from the content server, the first content distribution ratio and the second content distribution ratio are determined. In the process of determining the first content distribution ratio and the second content distribution ratio, the terminal uses the first content distribution ratio determined based on Equation (1) above. The terminal determines a third content distribution ratio based on Equation (3) below in order to determine how much of the second content portion is to be received through each of the base station-terminal path and the AP-terminal path. The third content distribution ratio is a ratio of a third content portion, which is a portion to be received through the AP-terminal path, to the second content portion as expressed in Equation (3) as follows.

$$\frac{AP\text{-terminal-}TV\text{ transmission rate}}{\text{demanded transmission rate}} = \text{third content distribution ratio} \quad (3)$$

The terminal also determines a fourth content distribution ratio based on Equation (4) below. The fourth content distribution ratio is a ratio of a fourth content portion, which is a portion to be received through the base station-terminal path, to the second content portion as expressed in Equation (4) as follows.

$$\frac{\text{demanded transmission rate} - (AP\text{-}TV\text{ transmission rate}) - (AP\text{-terminal-}TV\text{ transmission rate})}{\text{demanded transmission rate}} = \text{fourth content distribution ratio} \quad (4)$$

Accordingly, the terminal determines that a ratio obtained by summing up the third content distribution ratio and the fourth content distribution ratio is the second content distribution ratio.

The terminal sends a request for the third content portion of the second content portion to the content server through the AP. The terminal also sends a request for the fourth content portion of the second content portion to the content server through the base station. In this case, the second content portion includes the third content portion and the fourth content portion.

In the process of receiving the second content portion from the content server, the terminal receives the third content portion, which corresponds to the third content distribution ratio, of the second content portion through the AP from the content server. The terminal receives the fourth content portion, which corresponds to the fourth content distribution ratio, of the second content portion through the base station from the content server.

According to an embodiment of the present disclosure, where the multi-point transmission rate fails to meet a demanded transmission rate given to the content, the terminal may first determine a base station-terminal-TV transmission rate, which is a transmission rate among the base station, the terminal, and the TV, based on the AP-terminal transmission rate and the terminal-TV transmission rate in order to maximally utilize the AP-TV transmission rate, the AP-terminal transmission rate, and the base station-terminal-TV transmission rate. Specifically, the terminal determines that the lesser of the AP-terminal transmission rate and the terminal-TV transmission rate is the base station-terminal-TV transmission rate. Subsequently, the terminal determines the multi-point transmission rate based on the AP-TV transmission rate, the AP-terminal-TV transmission rate, and the base station-terminal-TV transmission rate. Specifically, the terminal determines the multi-point transmission rate obtained by summing up the AP-TV transmission rate, AP-terminal-TV transmission rate, and base station-terminal-TV transmission rate. The terminal compares the determined multi-point transmission rate with the demanded transmission rate.

Where the multi-point transmission rate is less than the demanded transmission rate, the terminal determines the first content distribution ratio and the second content distribution ratio based on the multi-point transmission rate, the AP-TV transmission rate, the AP-terminal-TV transmission rate, and the base station-terminal-TV transmission rate in the process of determining the first content distribution ratio and the second content distribution ratio. Specifically, the terminal determines the first content distribution ratio based on Equation (1) above. In order to determine how much of the second content portion is to be received through the base station-terminal path and the AP-terminal path, the terminal determines the third content distribution ratio based on Equation (3) above in the process of determining the second content distribution ratio that includes the third content distribution ratio and the fourth content distribution ratio. The terminal also determines the fourth content distribution ratio based on Equation (5) as follows:

$$\frac{\text{base station-terminal-}TV\text{ transmission rate}}{\text{demanded transmission rate}} = \text{fourth content distribution ratio} \quad (5)$$

Subsequently, in the process of receiving the second content portion from the content server, the terminal receives the third content portion, which corresponds to the third content distribution ratio, of the second content portion through the AP from the content server. The terminal receives the fourth content portion, which corresponds to the fourth content distribution ratio, of the second content portion through the base station from the content server.

Figure 6:
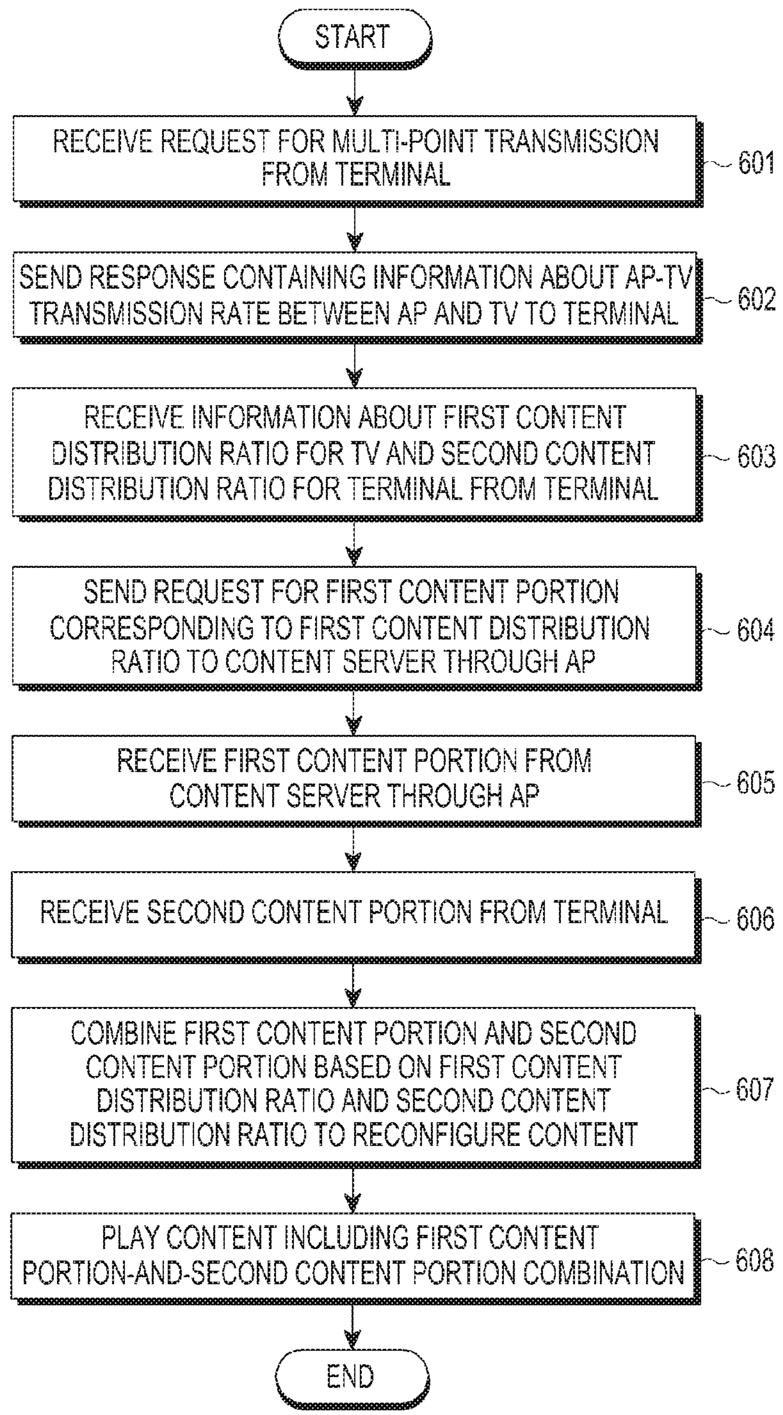
FIG. 6 is a flowchart of a multipoint-based content play method by a TV according to an embodiment of the present disclosure.

FIG. 6 is a flowchart of a multipoint-based content playing method of a TV according to an embodiment of the present disclosure.

A TV is in a state of having a connection, e.g., P2P/TDLS, with a terminal.

Referring to FIG. 6, the TV receives a request for multi-point transmission from the terminal in step 601. Accordingly, the TV determines whether to accept the multi-point transmission that transmits content from both an AP and the terminal.

The TV sends a response containing information about an AP-TV transmission rate between the AP and the TV to the terminal in step 602.

The response that the TV sends may further include capability information indicating to accept multi-point transmission and a terminal-TV transmission rate between the terminal and the TV.

The TV receives, from the terminal, information about a first content distribution ratio for the TV and a second content distribution ratio for the terminal in step 603.

The TV may further receive information about a content redistribution period from the terminal. The TV may repeat the process of receiving the request for multi-point transmission according to the content redistribution period, thereby re-transmitting the AP-TV transmission rate to the terminal and receiving the first content distribution ratio and second content distribution ratio that have been re-determined as per the terminal-TV transmission rate and the AP-terminal transmission rate.

The TV may further receive at least one of the URL of content and information about an application that provides a service for playing the content. Subsequently, the TV may run the application based on the application information.

The TV sends a request for the first content portion corresponding to the first content distribution ratio to the content server through the AP in step 604. Then, the TV may send the URL of the content to the content server through the AP so that the content server may recognize the content including the first content portion.

The TV receives the first content portion through the AP from the content server in step 605.

The TV receives the second content portion from the terminal in step 606.

The TV combines the first content portion and the second content portion based on the first content distribution ratio and the second content distribution ratio, thereby reconfiguring the content in step 607.

The TV plays the content containing the first content portion and second content portion combination in step 608.

Figure 7:
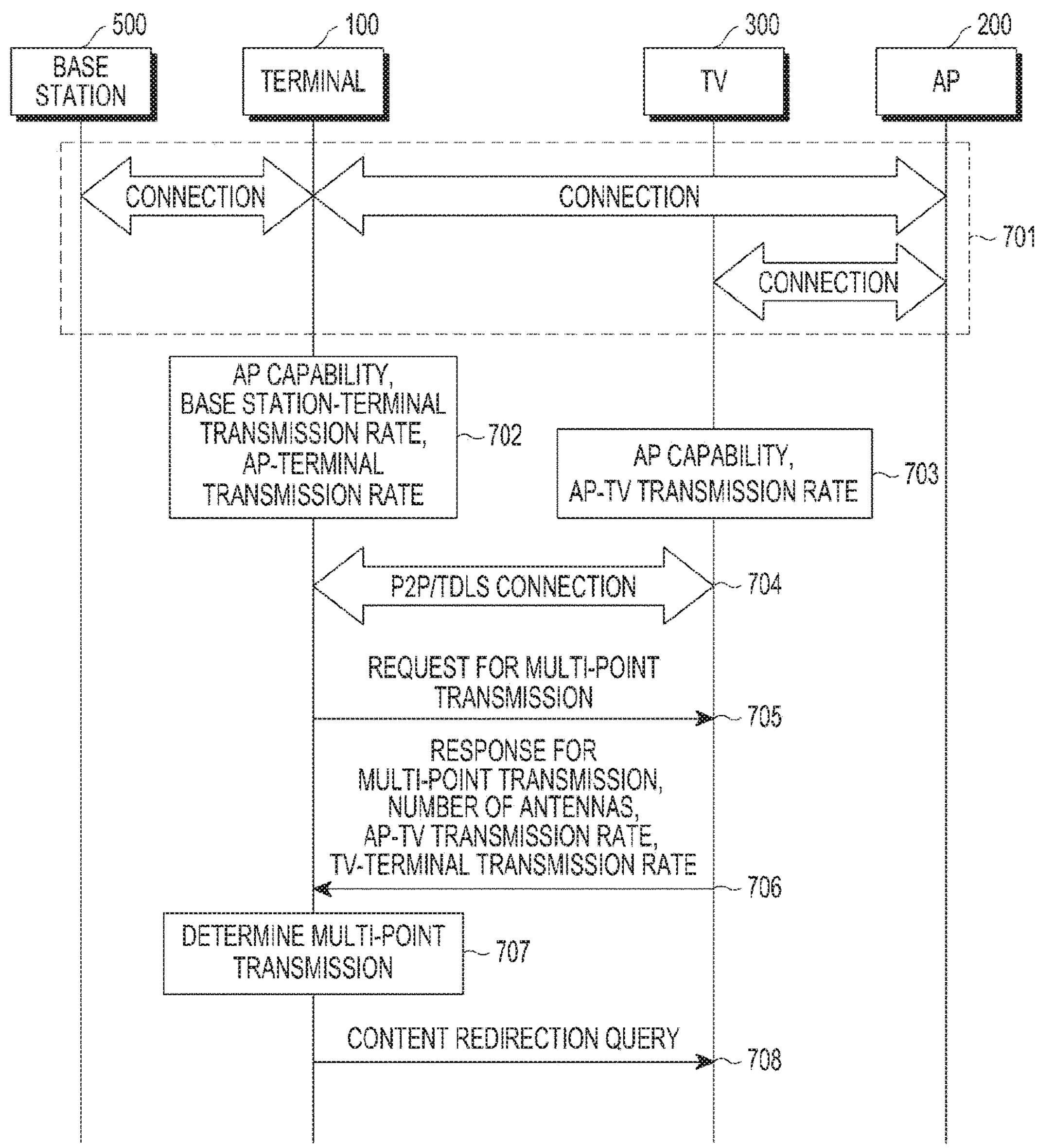
FIG. 7 is a flow diagram of an order for determining multi-point transmission among a base station, a TV, and an AP according to an embodiment of the present disclosure.

FIG. 7 is a flow diagram of an order for determining multi-point transmission among a base station, a TV, and an AP according to an embodiment of the present disclosure.

Referring to FIG. 7, a terminal 100 and an AP 200 are connected or a TV 300 and the AP 200 are connected. Selectively, a base station 500 may be connected to the terminal 100 in step 701. The terminal 100 recognizes an AP capability, a base station-terminal transmission rate, and an AP-terminal transmission rate in step 702. The TV 300 recognizes the AP capability and an AP-TV transmission rate in step 703. The terminal 100 may be connected to the TV 300 via a P2P/TDLS in step 704. Subsequently, the terminal 100 and the TV 300 may recognize a terminal-TV transmission rate. The terminal 100 sends a request for multi-point transmission to the TV in step 705. According to the request for multi-point transmission, the TV 300 sends a response to the multi-point transmission, an AP-TV transmission rate, and a TV-terminal transmission rate to the terminal 100 in step 706. Subsequently, the terminal 100 makes a determination as to multi-point transmission in step 707. Specifically, the terminal 100 determines whether to receive content through the AP-terminal path alone or both the base station-terminal path and the AP-terminal path based on the AP-terminal-TV transmission rate. The terminal 100 also determines the first content distribution ratio for the TV and the second content distribution ratio for the terminal. Accordingly, the terminal 100 sends a content redirection query according to the determination as to the multi-point transmission in step 708. In this case, the content redirection query is a command for a content redirection operation including at least one of the first content distribution ratio, the second content distribution ratio, the URL of the content, or the application information. After sending the content redirection query, the multi-point transmission through the terminal 100 and the AP 200 to the TV 300 is performed.

Figure 8:
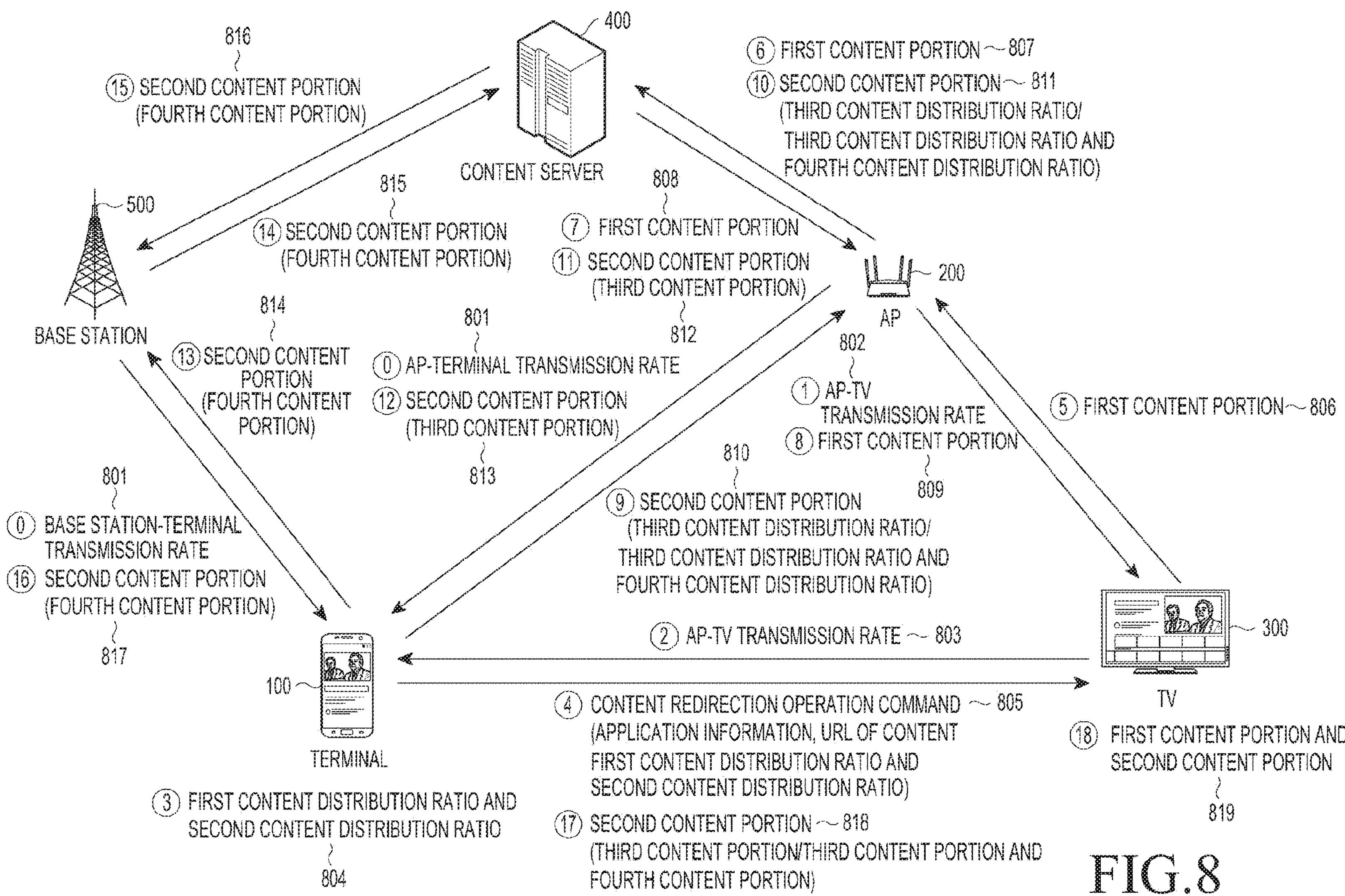
FIG. 8 is a flow diagram of transmission of information and an order among a base station, a terminal, a TV, an AP, and a content server according to an embodiment of the present disclosure.

FIG. 8 is a flow diagram of transmission of information and an order among a base station, a terminal, a TV, an AP, and a content server according to an embodiment of the present disclosure.

Referring to FIG. 8, a terminal 100 secures a base station-terminal transmission rate and an AP-terminal transmission rate in step 801. The TV 300 also secures an AP-TV transmission rate from the AP 200 in step 802. Subsequently, the TV 300 sends the AP-TV transmission rate to the terminal 100 in step 803. Then, the terminal 100 determines the first content distribution ratio and the second content distribution ratio in step 804 and instructs the TV 300 to perform a content redirection operation in step 805. Then, the terminal 100 sends, to the TV 300, at least one of the application information, the URL of the content, the first content distribution ratio, and the second content distribution ratio. Next, the TV 300 sends a request for the first content portion as per the first content distribution ratio to the AP 200 in step 806. The AP 200 also sends a request for the first content portion to the content server 400 in step 807. Subsequently, the content server 400 sends the first content portion to the AP 200 in step 808. The AP 200 also sends the first content portion to the TV 300 in step 809.

The terminal 100 sends a request for the second content portion as per the second content distribution ratio to the AP 200 in step 810. The AP 200 also sends a request for the second content portion to the content server 400 in step 811. Then, the second content distribution ratio may include only the third content distribution ratio depending on the size of the AP-terminal-TV transmission rate or the size of the multi-point transmission rate or may include the third content distribution ratio and the fourth content distribution ratio, i.e., both ratios. Where the second content distribution ratio includes only the third content distribution ratio or where the second content distribution ratio includes the third content distribution ratio and the fourth content distribution ratio, i.e., in both cases, the content server 400 transmits the third content portion which is the whole second content portion or a portion of the second content portion to the AP 200 in step 812. The AP 200 also sends the third content portion, which is the whole second content portion or includes a portion of the second content portion, to the terminal 100 in step 813. If the second content distribution ratio includes the fourth content distribution ratio, the terminal 100 sends a request for the fourth content portion, which corresponds to the fourth content distribution ratio, of the second content portion to the base station 500 in step 814. The base station 500 also sends a request for the fourth content portion, which corresponds to the fourth content distribution ratio, of the second content portion to the content server 400 in step 815. The content server 400 sends the fourth content portion, which corresponds to the fourth content distribution ratio and is included in a portion of the second content portion to the base station 500 in step 816. The base station 500 also sends the fourth content portion, which corresponds to the fourth content distribution ratio and is included in a portion of the second content portion to the terminal 100 in step 817.

Subsequently, the terminal 100 may send the third content portion which is the whole second content portion to the TV 300 or send the third content portion and fourth content portion, which are included in the second content portion, to the TV 300 in step 818. Accordingly, the TV 300 may receive the first content portion and second content portion from the terminal 100 in step 819 and combine and play them.

Figure 9:
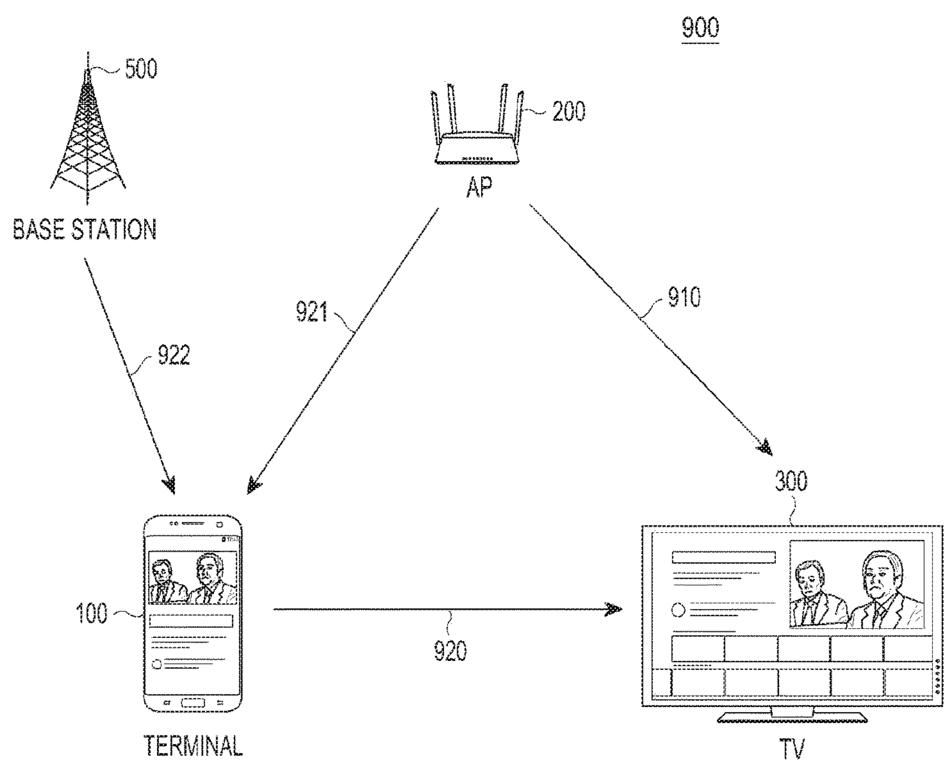
FIG. 9 is an illustration of content transmission paths according to an embodiment of the present disclosure.

FIG. 9 is an illustration of content transmission paths according to an embodiment of the present disclosure.

Referring to FIG. 9, content transmission paths 900 include an AP-TV path 910 which is a path between an AP 200 and a TV 300, a terminal-TV path 920 which is a path between a terminal 100 and the TV 300, an AP-terminal path 921 which is a path between the AP 200 and the terminal 100, and a base station-terminal path 922 which is a path between a base station 500 and the terminal 100.

Where the AP-terminal-TV transmission rate is greater than a predetermined threshold, a first content portion of content is sent to the TV 300 through the AP-TV path 910. The second content portion, which is the remainder of the content except for the first content portion, is sent through the AP-terminal path 921 to the TV 300. Where the AP-terminal-TV transmission rate is greater than the predetermined threshold, the AP-TV path 910 is utilized at the maximum transmission rate. In other words, where the AP-terminal-TV transmission rate is greater than the predetermined threshold, the first content distribution ratio is greater than the second content distribution ratio.

Unless the AP-terminal-TV transmission rate is greater than a predetermined threshold, the first content portion of the content is sent to the TV 300 through the AP-TV path 910. The second content portion, which is the remainder of the content except for the first content portion, is sent through the AP-terminal path 921 and the base station-terminal path 922 to the TV 300. Unless the AP-terminal-TV transmission rate is greater than the predetermined threshold, the AP-terminal path 921 and the AP-TV path 910 are utilized at the maximum transmission rate.

Where the multi-point transmission rate is less than the demanded transmission rate given for the content, the first content portion of the content is sent to the TV 300 through the AP-TV path 910. The second content portion, which is the remainder of the content except for the first content portion, is sent through the AP-terminal path 921 and the base station-terminal path 922 to the TV 300. Where the multi-point transmission rate is less than the demanded transmission rate, the AP-TV path 910, the terminal-TV path 920, the AP-terminal path 921, and the base station-terminal path 922, i.e., all of the paths, are maximally utilized.

Figure 10:
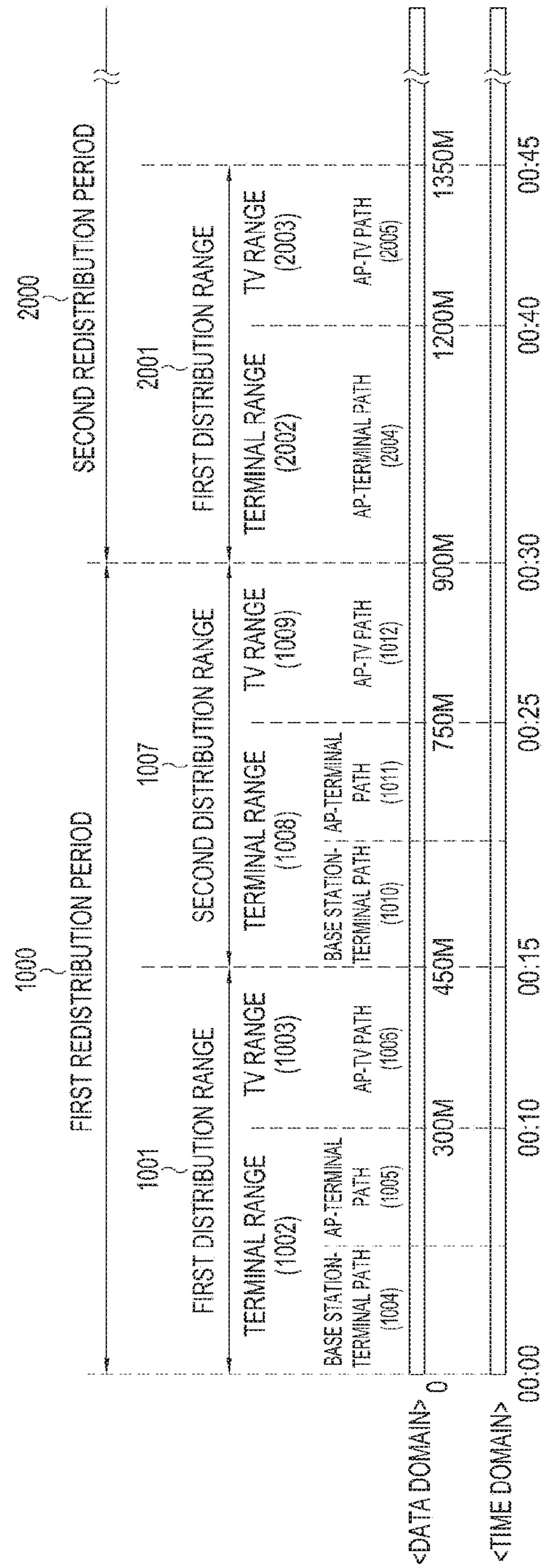
FIG. 10 is an illustration of a content redistribution period according to an embodiment of the present disclosure.

FIG. 10 an illustration of a content redistribution period according to an embodiment of the present disclosure.

Referring to FIG. 10, a plurality of content redistribution periods, e.g., a first redistribution period 1000 and a second redistribution period 2000, having the same length and configuration are repeated. The first redistribution period 1000 includes a plurality of distribution ranges, e.g., a first distribution range 1001 and a second distribution range 1007. The first distribution range 1001 includes a terminal range 1002 and a TV range 1003. In this case, the terminal range 1002 is a range where the second content portion corresponding to the second content distribution ratio is transmitted through the terminal-TV path to the TV, and the TV range 1003 is a range where the first content portion corresponding to the first content distribution ratio is transmitted through the AP-TV path to the TV.

The terminal range 1002 may include only an AP-terminal path 1005 or include a base station-terminal path 1004 and an AP-terminal path 1005. In the terminal range 1002, the terminal receives the fourth content portion of the second content portion through the base station-terminal path 1004 and the third content portion of the second content portion through the AP-terminal path 1005. In the example shown, the second content portion received by the terminal in the terminal range 1002 may be a range from 0M to 300M in the data domain for the content and a range from 0 seconds to 10 seconds in the time domain for the content. In the TV range 1003, the TV receives the first content portion through the AP-TV path 1006. In the example shown, the first content portion received by the TV in the TV range 1003 may be a range from 300M to 450M in the data domain for the content and a range from 10 seconds to 15 seconds in the time domain for the content. The distribution method is not subject to a change within one content redistribution period. Accordingly, the terminal range 1008 and the TV range 1009 of the second distribution range 1007 are configured in the same manner as the terminal range 1002 and TV range 1003 of the first distribution range 1001. The data-domain range and time-domain range corresponding to the base station-terminal path 1010 and AP-terminal path 1011 of the second distribution range 1007 are also configured in the same manner as the data-domain range and time-domain range corresponding to the base station-terminal path 1004 and AP-terminal path 1005 of the first distribution range 1001. The data-domain range and time-domain range corresponding to the AP-TV path 1012 of the second distribution range 1007 are also configured in the same manner as the data-domain range and time-domain range corresponding to the AP-TV path 1006 of the first distribution range 1001.

The terminal may send the first content distribution ratio and the second content distribution ratio in each distribution range or in each content redistribution period. Where the first content distribution ratio and the second content distribution ratio corresponding to one distribution range are not changed, the terminal may abstain from retransmitting the first content distribution ratio and the second content distribution ratio to the TV within the distribution range.

To enhance the content transmission rate of the TV, the terminal identifies the AP-terminal-TV transmission rate at each content redistribution period and then determines the first content distribution ratio and second content distribution ratio. Accordingly, the distribution range in the second redistribution period 2000 may be changed.

The second redistribution period 2000 may also include a plurality of distribution ranges as does the first redistribution period 1000. The first distribution range 2001 of the second redistribution period 2000 includes a terminal range 2002 and a TV range 2003. In the terminal range 2002, the terminal receives the second content portion only through the AP-terminal path 2004. In this case, the range of the second content portion received by the terminal in the terminal range 2002 may be a range from 900M to 1200M in the data domain for the content and a range from 30 seconds to 40 seconds in the time domain for the content. In the TV range 2003, the TV receives the first content portion through the AP-TV path 2005. In the example shown, the range of the first content portion received by the TV in the TV range 2003 may be a range from 1200M to 1350M in the data domain for the content and a range from 40 seconds to 45 seconds in the time domain for the content.

Where the content must be redistributed due to a move of the terminal, a content redistribution is possible regardless of the content redistribution period.

Figure 11:
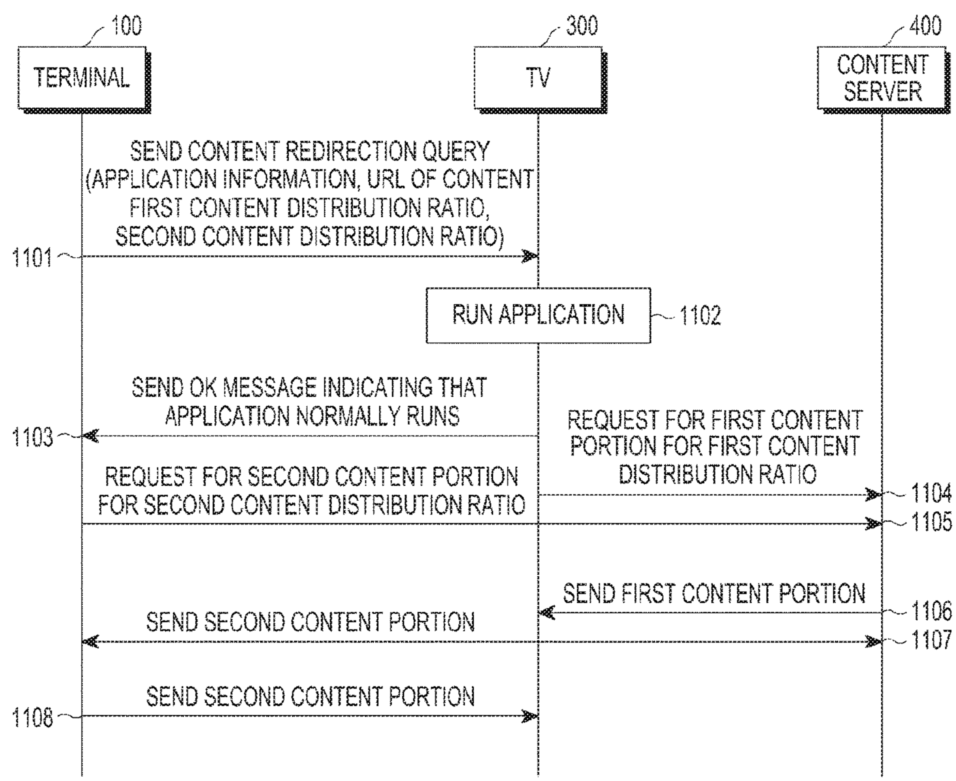
FIG. 11 is a flow diagram of an order of content distribution among a terminal, a TV, and a content server according to an embodiment of the present disclosure.

FIG. 11 is a flow diagram of an order of content distribution among a terminal, a TV, and a content server according to an embodiment of the present disclosure.

Referring to FIG. 11, a terminal 100 sends a content redirection query according to the determination as to the multi-point transmission in step 1101. In this case, the content redirection query is a command for a content redirection operation including at least one of the first content distribution ratio, second content distribution ratio, a URL of the content, or application information. A TV 300 runs an application in response to the content redirection query in step 1102. If the application runs normally, the TV 300 sends an OK message to the terminal 100 to indicate that the application runs normally in step 1103. Then, the TV 300 sends a request for the first content portion for the first content distribution ratio to a content server 400 in step 1104. The terminal 100 also sends a request for the second content portion for the second content distribution ratio in step 1105. Then, the request for the first content portion and the request for the second content portion may be simultaneously made. Subsequently, the content server 400 sends the first content portion to the TV 300 in step 1106. The content server 400 also sends the second content portion to the terminal 100 in step 1107. Then, the transmission of the first content portion and the transmission of the second content portion may be simultaneously performed. Subsequently, the terminal 100 sends the second content portion to the TV 300 in step 1108.

Figure 12:
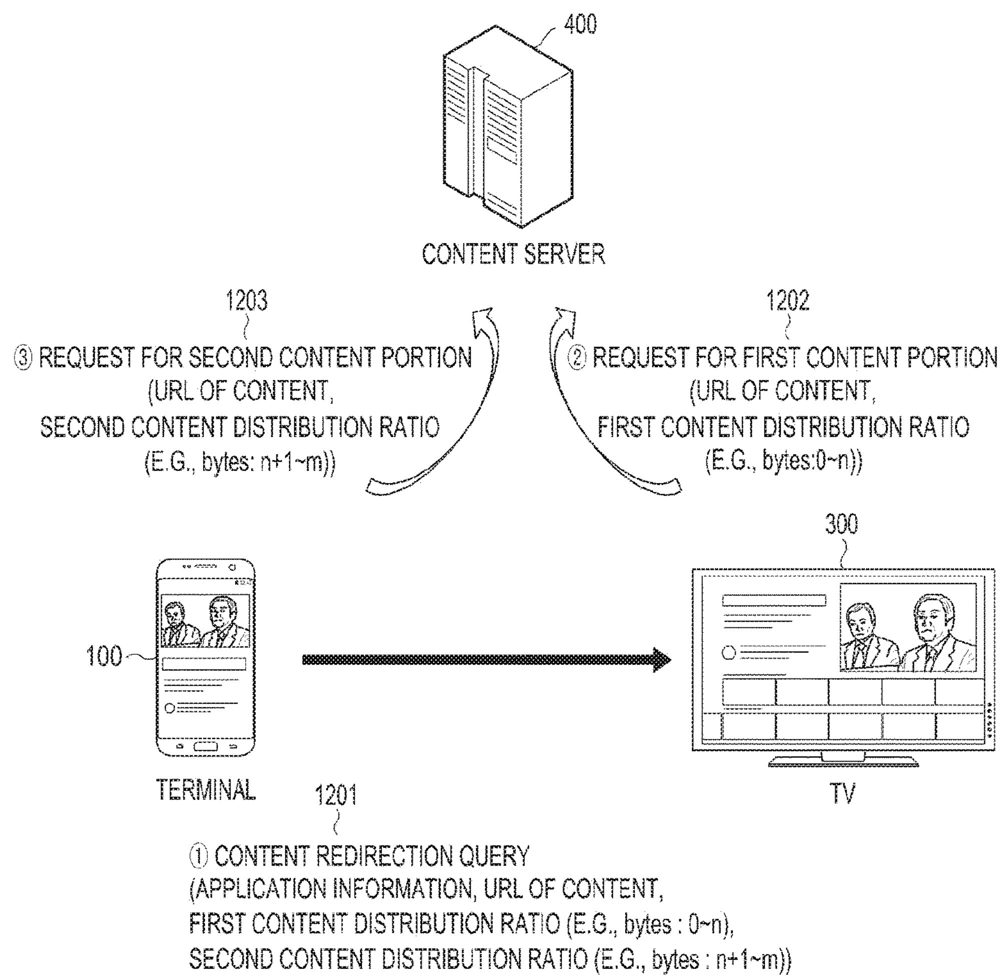
FIG. 12 is an illustration of transmission information and an order among a content server, a terminal, and a TV upon content distribution according to an embodiment of the present disclosure.

FIG. 12 is an illustration of transmission information and an order among a content server, a terminal, and a TV upon content distribution according to an embodiment of the present disclosure.

Referring to FIG. 12, a terminal 100 sends a content redirection query to a TV 300 in step 1201. In this case, the content redirection query includes at least one of the first content distribution ratio, the second content distribution ratio, the URL of the content, or application information. For example, where the unit of transmission of the content is (m+1) bytes, the first content portion corresponding to the first content distribution ratio may be 0 bytes to n bytes, and the first content distribution ratio may be denoted by n. The second content portion corresponding to the second content distribution ratio may be n+1 bytes to m bytes, and the second content distribution ratio may be denoted by (n+1, m).

The TV 300 sends a request for the first content portion to the content server 400. In this case, the TV 300 sends a request for the first content portion corresponding to 0 bytes to n bytes and the URL of the content to the content server 400 in step 1202.

The terminal 100 sends a request for the second content portion to the content server 400. In this case, the terminal 100 sends a request for the second content portion corresponding to n+1 bytes to m bytes and the URL of the content to the content server 400 in step 1203. The request in step 1202 for the first content portion and the request in step 1203 for the second content portion may be simultaneously made. Corresponding content portions are delivered from the content server 400 to the TV 300 according to the requests in step 1202 and in step 1203.

Figure 13A:
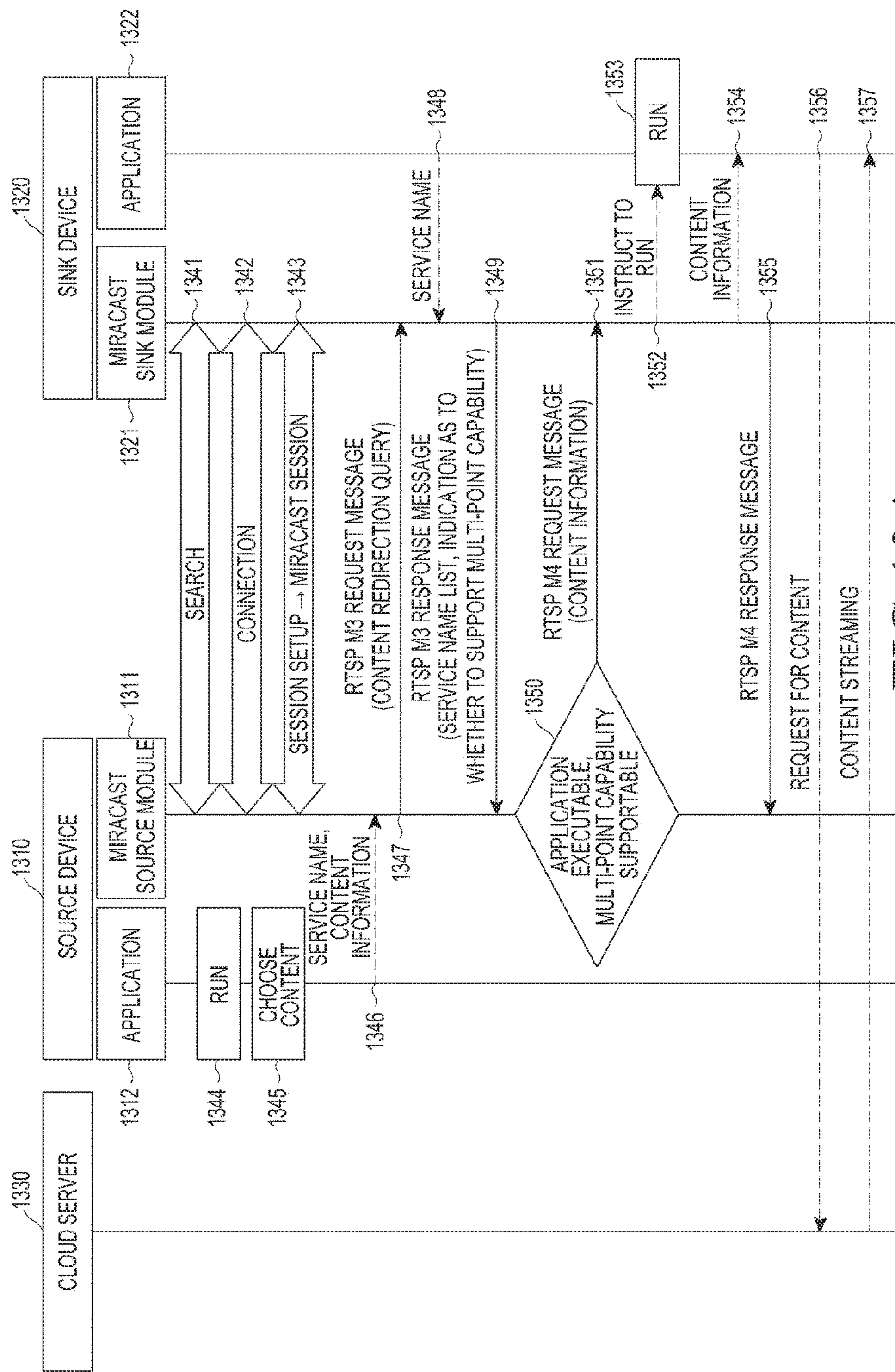
FIG. 13A is a flow diagram of an order of operation as per a miracast R2 standard having multi-point transmission applied thereto, according to an embodiment of the present disclosure.

FIG. 13A is a flow diagram of an order of operation as per a miracast R2 standard having multi-point transmission applied thereto, according to an embodiment of the present disclosure.

FIG. 13B is a table of formats of miracast R2 standard messages that add parameters necessary for multi-point transmission according to an embodiment of the present disclosure.

An order of operation of a multi-point transmission-applied miracast R2 standard is described below in detail with reference to FIGS. 13A and 13B.

Referring to FIG. 13A, various devices may be implemented as a source device 1310, a sink device 1320, and a cloud server 1330. For example, the above-described terminal may be implemented as the source device 1310, and the above-described TV may be implemented as the sink device 1320. The above-described content server may be implemented as the cloud server 1330.

The miracast source module 1311 in the source device 1310 and the miracast sink module 1321 in the sink device 1320, after device discovery, are connected together instep 1341 and in step 1342). After the connection, the miracast source module 1311 and the miracast sink module 1321 start a miracast session through a session setup in step 1343. Thereafter, an application 1312, i.e., an application for providing a content service, is run on the source device 1310 by a user in step 1344. The source device 1310 receives an input for selection of content through the application 1312 in step 1345. The application 1312 sends the service name and content information, i.e., the URL of the content, to the miracast source module 1311 in step 1346. The miracast source module 1311 sends a real-time streaming protocol (RTSP) M3 request message for a content redirection query to the miracast sink module 1321 in step 1347. In this case, the RTSP M3 request message contains a parameter 1360 in FIG. 13B for multi-point transmission. The parameter 1360 may include at least one of a buffer length (wfd-buffer-length) field and a multi-point capability (wfd-multipoint-capability) field.

The application 1322 installed on the sink device 1320, i.e., an application for providing a content service, sends the service name to the miracast sink module 1321 in step 1348 in FIG. 13A. The miracast sink module 1321 sends, to the miracast source module 1311, an RTSP M3 response message containing a parameter 1370 in FIG. 13B for multi-point transmission in step 1349 in FIG. 13A. The parameter 1370 for multi-point transmission may include at least one of a multi-point capability field, an AP-TV transmission rate (AP-TV rate), a terminal-TV transmission rate (Phone-TV rate), and a buffer length (Buffer). The miracast sink module 1321 sends, through the RTSP M3 response message to the miracast source module 1311, an instruction as to whether to support multi-point capability and a service name list.

Where the miracast sink module 1321 can run the application, and the multi-point capability can be supported in step 1350, the miracast source module 1311 sends, to the miracast sink module 1321, an RTSP M4 request message containing a parameter 1380 for multi-point transmission in step 1351. The parameter 1380 in FIG. 13B for multi-point transmission includes at least one of a multi-point capability field, and information about a first content distribution ratio (Range 1) or a second content distribution ratio (Range 2).

According to the RTSP M4 request message, the miracast sink module 1321 instructs the application 1322 to run in step 1352 in FIG. 13A and runs the application installed on the sink device 1320, and the miracast sink module 1321 sends content information to the application 1322 in step 1354. In response to the reception of the RTSP M4 request message, the miracast sink module 1321 may send an RTSP M4 response message to the miracast source module 1311 in step 1355. The application 1322 of the sink device 1320 sends a content request to the cloud server 1330 in step 1356, and the cloud server 1330 streams content to the application 1322 corresponding to the content request in step 1357. The content request in step 1356 is one for requesting the second content portion corresponding to the second content range included in the RTSP M4 request message in step 1351.

The sink device 1320 may receive the first content portion corresponding to the first content range from the AP and combine and play the first content portion and the second content portion.

Figure 14:
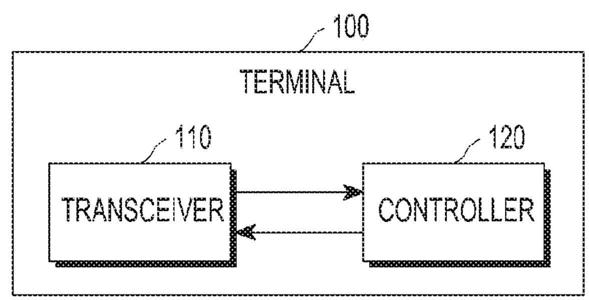
FIG. 14 is a block diagram of a terminal according to an embodiment of the present disclosure.

FIG. 14 is a block diagram of a terminal according to an embodiment of the present disclosure. For ease of description, components not directly related to the present disclosure are neither shown nor described.

Referring to FIG. 14, a terminal 100 includes a transceiver 110 and a controller 120.

The transceiver 110 sends a request for multi-point transmission for the content to a display device and receives, from the display device, information about a first transmission rate between the display device and an AR The transceiver 110 also sends, to the display device, information about at least one of a first content distribution ratio for the display device and a second content distribution ratio for a terminal and receives, from a content server, a second content portion corresponding to the second content distribution ratio of the content. The transceiver 110 also sends the second content portion to the TV.

The controller 120 determines the first content distribution ratio and the second content distribution ratio based on a demanded transmission rate for transmission of the content and the first transmission rate.

Figure 15:
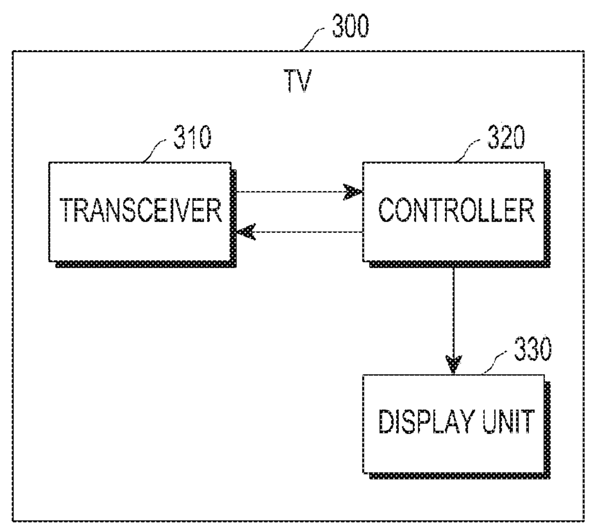
FIG. 15 is a block diagram of a TV according to an embodiment of the present disclosure.

FIG. 15 is a block diagram of a TV according to an embodiment of the present disclosure. For ease of description, components not directly related to the present disclosure are neither shown nor described.

Referring to FIG. 15, a TV 300 includes a transceiver 310, a controller 320, and a display unit 330.

The transceiver 310 receives, from a terminal, a multi-point transmission request for content, sends to the terminal information about a first transmission rate between a display device and an AP, and receives information about at least one of a first content distribution ratio for the display device and a second content distribution ratio for the terminal from the terminal. The transceiver 310 receives, from a content server, a first content portion corresponding to the first content distribution ratio of the content and receives a second content portion from the terminal.

The controller 320 combines the first content portion and the second content portion based on the first content distribution ratio and the second content distribution ratio and plays the combination of the first content portion and the second content portion.

The display unit 330 displays the first content portion and second content portion played.

Various embodiments of the present disclosure may be implemented in computer readable codes in a non-transitory computer readable recording medium in some aspects. The non-transitory computer readable recording medium is a data storage device that may store data readable by a computer system. Examples of the non-transitory computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The non-transitory computer readable recording medium may be distributed by computer systems over a network, and accordingly, the computer readable codes may be stored and executed in a distributed manner. Functional programs, codes, and code segments to attain various embodiments of the present disclosure may be readily interpreted by skilled programmers in the art to which the present disclosure pertains.

The apparatuses and methods according to embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), digital versatile discs (DVDs), magnetic disks, magnetic tapes, or other optical or magnetic storage devices while retained in machine (e.g., computer)-readable storage media. The methods according to embodiments of the present disclosure may be implemented by a computer or a portable terminal including a controller and a memory, and the memory may be an exemplary machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

The embodiments herein are provided merely for better understanding of the present disclosure, and the present disclosure is not intended to be limited thereto or thereby. The embodiments set forth herein are merely examples, and it will be apparent to one of ordinary skill in the art that various changes may be made thereto without departing from the scope of the present disclosure as defined by the appended claims and their equivalents.

What is claimed is:

1. A method for transmitting a content by a terminal, the method comprising:
- sending a request for multi-point transmission for the content to a display device;
- receiving information about a first transmission rate between the display device and an access point (AP) from the display device;
- determining a first content distribution ratio for the display device and a second content distribution ratio for the terminal based on a demanded transmission rate for transmission of the content and the first transmission rate;
- sending information about at least one of the first content distribution ratio and the second content distribution ratio to the display device;
- receiving a second content portion corresponding to the second content distribution ratio of the content from a content server; and
- sending the second content portion to the display device.

2. The method of claim 1, further comprising:

determining a fourth transmission rate among the AP, the terminal, and the display device based on a number of antennas of the terminal, a second transmission rate between the AP and the terminal, and a third transmission rate between the display device and the terminal; and determining whether to receive the second content portion through the AP or through the AP and a base station based on the fourth transmission rate.

3. The method of claim 2, wherein if the fourth transmission rate is greater than a predetermined threshold, the second content portion is determined to be received from the content server through the AP.

4. The method of claim 2, wherein unless the fourth transmission rate is greater than a predetermined threshold, the second content portion is determined to be received from the content server through each of the base station and the AP.

5. The method of claim 1, wherein determining the first content distribution ratio for the display device and the second content distribution ratio for the terminal includes determining a multi-point transmission rate including the first transmission rate, a fourth transmission rate among the AP, the terminal, and the display device, and a fifth transmission rate among a base station, the terminal, and the display device and determining the first content distribution ratio and the second content distribution ratio based on the demanded transmission rate and the multi-point transmission rate.

6. The method of claim 5, wherein if the multi-point transmission rate is less than the demanded transmission rate, the first content distribution ratio and the second content distribution ratio are determined based on the multi-point transmission rate, the first transmission rate, the fourth transmission rate, and the fifth transmission rate.

7. The method of claim 1, further comprising:

determining a content redistribution period to which the first content distribution ratio and the second content distribution ratio are applied; and repeating a process of sending a request for multi-point transmission to the display device according to the content redistribution period.

8. A method for receiving a content by a display device, the method comprising:

receiving a request for multi-point transmission for the content from a terminal;

sending information about a first transmission rate between the display device and an access point (AP) to the terminal;

receiving information about at least one of a first content distribution ratio for the display device and a second content distribution ratio for the terminal from the terminal;

receiving a first content portion corresponding to the first content distribution ratio of the content from a content server;

receiving a second content portion corresponding to the second content distribution ratio from the terminal; and combining and playing the first content portion and the second content portion.

9. The method of claim 8, further comprising:

receiving, from the terminal, information about a content redistribution period to which the first content distribution ratio and the second content distribution ratio are applied; and repeating a process of receiving the request for multi-point transmission from the terminal according to the content redistribution period.

10. A terminal transmitting a content, the terminal comprising:

a transceiver configured to send a request for multi-point transmission for the content to a display device and receive information about a first transmission rate between the display device and an access point (AP) from the display device; and a controller configured to determine a first content distribution ratio for the display device and a second content distribution ratio for the terminal based on a demanded transmission rate for transmission of the content and the first transmission rate, wherein the transceiver is further configured to send information about at least one of the first content distribution ratio and the second content distribution ratio to the display device, receive a second content portion corresponding to the second content distribution ratio of the content from a content server, and send the second content portion to the display device.

11. The terminal of claim 10, wherein the controller determines a fourth transmission rate among the AP, the terminal, and the display device based on a number of antennas of the terminal, a second transmission rate between the AP and the terminal, and a third transmission rate between the display device and the terminal and determines whether to receive the second content portion through the AP or through the AP and a base station based on the fourth transmission rate.

12. The terminal of claim 11, wherein if the fourth transmission rate is greater than a predetermined threshold, the controller determines to receive the second content portion from the content server through the AP.

13. The terminal of claim 11, wherein unless the fourth transmission rate is greater than a predetermined threshold, the controller determines to receive the second content portion from the content server through each of the base station and the AP.

14. The terminal of claim 10, wherein the controller determines a multi-point transmission rate including the first transmission rate, a fourth transmission rate among the AP, the terminal, and the display device, and a fifth transmission rate among a base station, the terminal, and the display device, compares the multi-point transmission rate with the demanded transmission rate, and determines the first content distribution ratio and the second content distribution ratio considering a result of the comparison.

15. The terminal of claim 14, wherein if the multi-point transmission rate is less than the demanded transmission rate, the first content distribution ratio and the second content distribution ratio are determined based on the multi-point transmission rate, the first transmission rate, the fourth transmission rate, and the fifth transmission rate.

16. The terminal of claim 10, wherein the controller determines a content redistribution period to which the first content distribution ratio and the second content distribution ratio are applied and repeats sending a request for multi-point transmission to the display device according to the content redistribution period.

17. A display device receiving a content, the display device comprising:

a transceiver configured to receive a request for multi-point transmission for the content from a terminal, send information about a first transmission rate between the display device and an access point (AP) to the terminal, receive information about at least one of a first content distribution ratio for the display device and a second content distribution ratio for the terminal from the terminal, receive a first content portion corresponding to the first content distribution ratio of the content from a content server, and receive a second content portion corresponding to the second content distribution ratio from the terminal; and a controller configured to combine the first content portion and the second content portion based on the first content distribution ratio and the second content distribution ratio and play the first content portion and the second content portion combination through a display unit.

18. The display device of claim 17, wherein the transceiver receives information about a content redistribution period to which the first content distribution ratio and the second content distribution ratio are applied and receives the request for multi-point transmission from the terminal according to the content redistribution period.

* * * * *